Dec. 7, 1943.  W. SCHADE ET AL  2,336,301
LONG FOCAL LENGTH LENS
Filed May 8, 1942
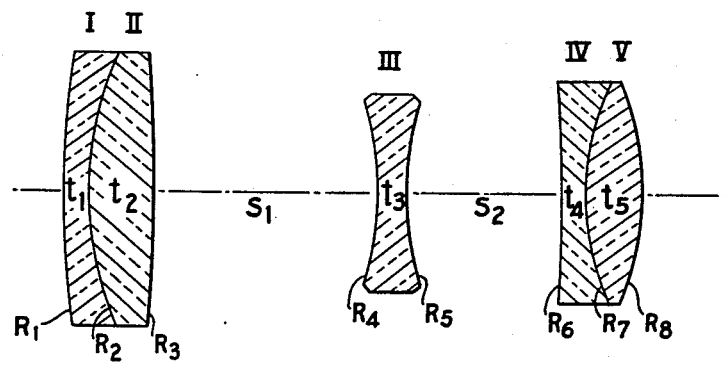
| f = 100 mm. | | | | f/6.3 |
|---|---|---|---|---|
| LENS | $N_D$ | $\nu$ | RADII | THICKNESSES |
| I | 1.559 mm. | 45.5 mm. | $R_1 = +43.8$ mm. | $t_1 = 1.22$ mm. |
| II | 1.611 | 58.8 | $R_2 = +15.6$ | $t_2 = 2.92$ |
|    |       |      | $R_3 = -282.2$ | $S_1 = 10.65$ |
| III | 1.525 | 54.8 | $R_4 = -27.4$ | $t_3 = 1.22$ |
|    |       |      | $R_5 = +29.0$ | $S_2 = 7.12$ |
| IV | 1.559 | 45.5 | $R_6 = -421.4$ | $t_4 = 1.22$ |
| V | 1.620 | 60.4 | $R_7 = +23.6$ | $t_5 = 2.41$ |
|   |       |      | $R_8 = -27.9$ | $T = 26.76$ |
WILLY SCHADE
KARL TOLLE
WESLEY VAN GRAAFEILAND
INVENTORS
BY
ATT'Y & AG'T Patented Dec. 7, 1943

2,336,301

UNITED STATES PATENT OFFICE 2,336,301

LONG FOCAL LENGTH LENS

Willy Schade, Karl Tolle, and Wesley Van Graafeiland, Rochester, N. Y., assignors to Eastman Kodak Company, Rochester, N. Y., a corporation of New Jersey Application May 8, 1942, Serial No. 442,164

2 Claims. (Cl. 88—57)

This invention relates to photographic objectives, particularly to objectives which are useful when made up in long focal lengths.

It is the object of the present invention to provide a lens which has an exceptionally flat field over a relatively small angle, less than 10 degrees from the axis. It is also an object of the invention to provide a lens highly corrected for coma, spherical aberration and particularly for lateral color, the other aberrations being held within the usual tolerance limits.

One particular embodiment of the invention is designed to have the chromatic aberration highly corrected in the red and infrared regions of the spectrum, at the expense of correction in the other regions. Such a lens is particularly useful with red or infrared filters. The correcting of a lens for the particular region of the spectrum in which it is to operate is described in U. S. 2,165,365, Frederick and Schade, and is not considered to be a novel part of the present invention.

The lens resulting from the present invention is similar to a very early lens taught by Harting in U. S. Patent 766,036 which issued July 26, 1904.

The present invention although not derived directly from that early lens, may be considered as an improvement thereover to gain the advantages described above. From this point of view, the advantages of the invention can be said to be gained by increased spacing of the components giving greater overall length and by shifting the power from one component to another, making the cemented surface in the front component more strongly curved than that in the rear component. The "front" of a lens is the long conjugate side thereof as normally used.

The preferred embodiment of the invention is shown in the accompanying drawing.

In the drawing there is illustrated a lens having the following specifications:

f=100 mm.  f/6.3

| Lens | $N_D$ | V | Radii | Thickness |
|---|---|---|---|---|
| I | 1.559 | 45.5 | $R_1=+$ 43.8 mm. | $t_1=$ 1.22 mm. |
| II | 1.611 | 58.8 | $R_2=+$ 15.6 | $t_2=$ 2.92 |
|  |  |  | $R_3=-$ 282.2 | $S_1=$ 10.65 |
| III | 1.525 | 54.8 | $R_4=-$ 27.4 | $t_3=$ 1.22 |
|  |  |  | $R_5=+$ 29.0 | $S_2=$ 7.12 |
| IV | 1.559 | 45.5 | $R_6=-$ 421.4 | $t_4=$ 1.22 |
| V | 1.620 | 60.4 | $R_7=+$ 23.6 | $t_5=$ 2.41 |
|  |  |  | $R_8=-$ 27.9 | $T=$ 26.76 |

In the above table it will be noted that the overall length of the lens is between .25F and .5F where F is the focal length of the objective. The air spaces are so great that their sum is between .1F and .3F and each of them is between .05F and .2F. Furthermore, the cemented surface of the front component has a radius of curvature $R_2$ which is less than that of the cemented surface ($R_7$) of the rear component. That is, the front cemented surface is more strongly curved than the rear cemented surface.

Having thus described the preferred embodiment of the invention, we wish to point out that it is limited only by the accompanying claims.

What we claim and desire to secure by Letters Patent of the United States is:

1. A highly corrected photographic objective consisting of a negative component spaced between two doublets each of which doublets has a negative element cemented to the front of a positive element characterized by the overall length of the lens being between .25F and .5F where F is the focal length of the objective, by the sum of the two air spaces being between .1F and .3F, by each of said air spaces being between .05F and .2F, by the cemented surface of the front doublet being more strongly curved than the cemented surface of the rear doublet, which latter cemented surface is convex to the front, and by the front surface of the rear doublet having a radius of curvature whose absolute value is greater than F.

2. A photographic objective having approximately the following characteristics:

| Lens | $N_D$ | V | Radii | Thicknesses |
|---|---|---|---|---|
| I | 1.56 | 46 | $R_1=+$ .44F | $t_1=$ .01F |
| II | 1.61 | 59 | $R_2=+$ .16F | $t_2=$ .03F |
|  |  |  | $R_3=-$ 2.8F | $S_1=$ .1F |
| III | 1.53 | 55 | $R_4=-$ .27F | $t_3=$ .01F |
|  |  |  | $R_5=+$ .29F | $S_2=$ .07F |
| IV | 1.56 | 46 | $R_6=-$ 4.2F | $t_4=$ .01F |
| V | 1.62 | 60 | $R_7=+$ .24F | $t_5=$ .02F |
|  |  |  | $R_8=-$ .28F | $T=$ .3F |

Where F is the focal length of the objectives, Roman numerals refer to lens elements from front to rear, $N_D$ is the index of refraction for the D line of the spectrum, V is the dispersive index, $R_1$ to $R_8$ are respectively the radii of curvature of the refractive surfaces from front to rear, $t_1$ to $t_5$ are respectively the thicknesses of the elements, and $S_1$ and $S_2$ are respectively the air spaces between the components measured on the axis, T is the overall length and the $+$ and $-$ signs refer respectively to surfaces convex and concave to the front.

WILLY SCHADE.
KARL TOLLE.
WESLEY VAN GRAAFEILAND.